United States Patent [19]

Mudge et al.

[11] 4,448,063

[45] May 15, 1984

[54] ENGINE COLD TESTING

[75] Inventors: Ronald K. Mudge, Brighton; Edwin E. Rice, Farmington Hills, both of Mich.

[73] Assignee: Ingersoll-Rand Company, Woodcliff Lake, N.J.

[21] Appl. No.: 463,400

[22] Filed: Feb. 3, 1983

[51] Int. Cl.$^3$ ............................................ G01M 15/00
[52] U.S. Cl. ...................................... 73/117.2; 73/115
[58] Field of Search ..................... 73/117.2, 117.3, 116, 73/69, 119 R, 115

[56] References Cited

U.S. PATENT DOCUMENTS

| | | | |
|---|---|---|---|
| 3,625,054 | 12/1971 | Vesper | 73/116 X |
| 3,864,963 | 2/1975 | Rivere | 73/115 |
| 4,126,037 | 11/1978 | Hanson | 73/116 |
| 4,311,041 | 1/1982 | Reid | 73/117.3 |

Primary Examiner—Jerry W. Myracle
Assistant Examiner—Ellwood G. Harding, Jr.
Attorney, Agent, or Firm—Walter C. Vliet

[57] ABSTRACT

Disclosed is a method and apparatus for cold testing of typical piston engines to determine their internal integrity and tolerance prior to further testing or use which could be destructive if a defect exists. A source of pressure oil is fed to the normal engine oil pressure system while the engine is slowly rotated. The amount of oil flow is measured and recorded by a unique orifice flow device which yields a differential pressure signal in proportion to the oil flow as the engine is rotated. The variation in oil flow in selected segments of rotation is analyzed to determine the engine condition. Such common assembly faults as missing rod or main bearings, loose bearing caps, or excessive bearing clearance may be detected and isolated for repair.

16 Claims, 9 Drawing Figures

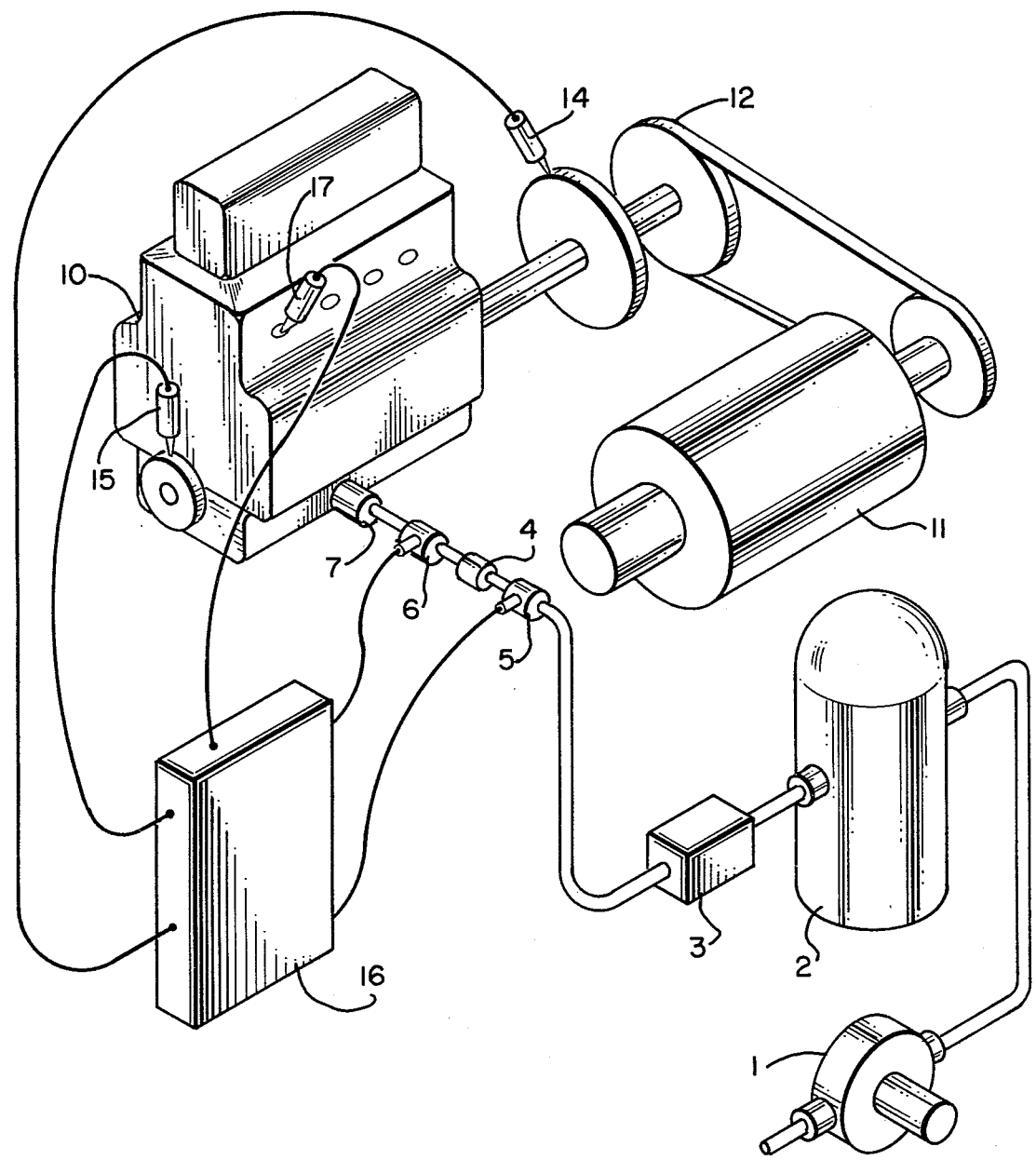
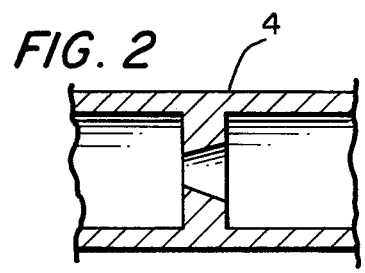
FIG. 2
FIG. 1

ENGINE COLD TESTING

BACKGROUND OF THE INVENTION

After assembly modern automotive engines and the like are generally tested prior to final installation in the vehicle. Such tests usually include some form of run in or hot test to assure proper operation. Where defects are found, it is generally easier to effect repair under assembly line conditions where access to the engine is better. A number of defects which are not readily detectable prior to run in tests can result in damage to the engine. Such defects are missing bearings, blocked oil ports or excessive clearances. A number of engine manufacturers have instituted pre-hot tests to minimize such possibilities. The present invention relates to one such test which can readily detect a number of the above mentioned defects and even isolate the defect prior to engine disassembly.

It is an object of this invention to determine the integrity of the engine assembly prior to run in or hot engine tests by analyzing lubricating oil flow.

It is a further object of this invention to provide an apparatus capable of detecting missing or out of tolerance bearings or plugged engine lubrication oil ports.

It is yet a further object of this invention to disclose a method of analyzing the lubricating oil flow rate to detect common engine defects.

It is yet a further object of this invention to disclose a method whereby the oil pressure signature is systematically analyzed by dividing the area under the curve into equal segments representing oil flow within the segment to isolate faults in combination with the total oil flow.

It is yet a further object of this invention to correlate the segments with specific amounts of engine rotation to analyze the flow for a specific part of the engine cycle to isolate faults.

It is yet a further object of this invention to compare flows for a specific part of the engine cycle to other specific parts of the engine cycle to develop a flow signature using the discrete segments of flow for isolating faults. It is also an object of this invention to compare flows to established standards.

These and other objects are obtained in an apparatus for engine testing comprising a means for rotating the engine, means for supplying lubricating oil to the pressure oil supply gallery of the engine, means for measuring the flow of the lubricating oil on a continuous basis as the engine is rotated, means for determining the position of the engine in its rotary cycle, and means for determining the amount of lubricating oil flow relative to the position of the engine in its rotating cycle.

BRIEF DESCRIPTION OF THE DRAWINGS

FIG. 1 shows an engine oil signature analysis system according to the present invention.

FIG. 2 shows the detail of the orifice used in the oil flow measuring device of the present invention.

FIG. 3b is a trace of the oil pressure corresponding to FIG. 3a.

FIG. 3c is a trace of the compression in the No. 1 cylinder corresponding to FIG. 3a.

FIG. 3d is the trace of the engine position encoder corresponding to FIG. 3a.

DESCRIPTION OF THE PREFERRED EMBODIMENT

Figure 3A:
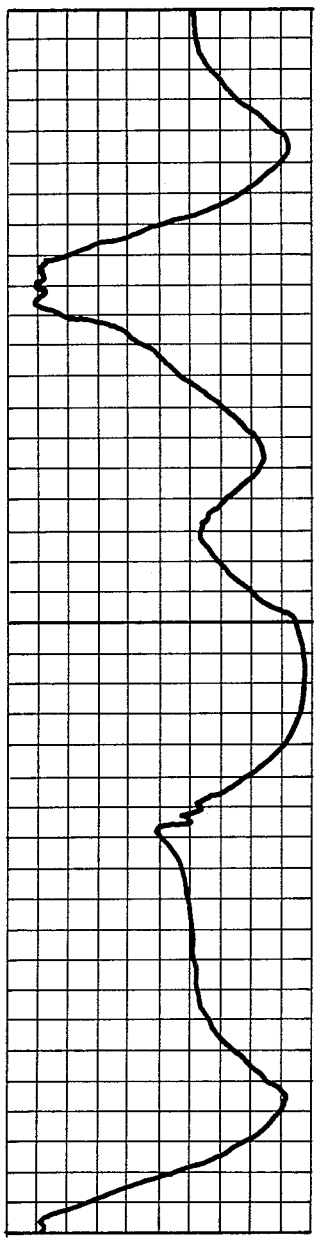
FIG. 3a is a trace of the oil flow signature produced by the engine analyzing system of the present invention.

The engine analyzing station shown in FIG. 1 is designed to provide a means to supply the engine with a metered amount of oil and check for missing bearing inserts, plugged oil passages and other faults. A means is provided to rotate the engine at given speeds while oil is forced through the engine oil gallery from a constant pressure supply. The oil flow through the gallery is measured and analyzed in distinct segments to isolate the source of the problem if one exists.

In FIG. 1, the oil is supplied by means of an oil pump designated by reference numeral 1. Oil from a suitable reservoir is supplied by oil pump 1 to a pressurized oil tank 2. Oil tank 2 is charged with oil before the test is begun. The pressurized oil tank, which may be of the air over diaphragm type, assures a smooth and continuous flow of oil to the engine when called for.

Flow from the pressurized oil tank is controlled by means of a solenoid valve 3, which is a typical high-flow electrically operated solenoid valve. The pressurized oil is then directed through a flow meter comprising an orifice plate 4 placed between two electronic pressure transducers 5 and 6, respectively.

The differential pressure measured across the sharp edged orifice, which is shown in FIG. 2, provides an accurate means for measuring the instantaneous oil flow to the engine. The sharp edged orifice is relatively insensitive to oil viscosity changes, however, best results are obtained when the engine block and oil temperatures are uniform from test to test or compensated for in some manner.

The metered oil flow is injected into the engine block through an oil filter adapter 7. The oil filter adapter fits in place of the conventional oil filter and provides access for the oil to the engine oil gallery.

A typical four cylinder engine 10 is shown for purposes of the present description. It should be understood, however, that the number of cylinders is immaterial to the test set-up, but particular engine variations such as the number of cylinders, type of bearings used, and location of oil ports and passages all affect the oil flow signature as measured by the pressure transducers across the orifice. The engine and engine type must therefore be analyzed to determine the normal pattern and the best amount of rotation to be selected for purposes of analyzing the oil flow signature.

For purposes of the test, it is important to rotate the engine at a reasonable and known speed. For purposes of the test set-up in FIG. 1, an electric motor 11 is used to drive the engine at 100 RPM through a suitable speed reducer 12. The type of speed reducer is not considered critical but should provide for a relatively smooth and constant drive of the engine.

In addition to the speed of the engine, it is also necessary to know the relative position of the engine rotation.

For this purpose, an engine incremental rotation (gear tooth wheel) pick-up 14,, a top dead center pick-up 15, and number one cylinder compression transducer 17 are shown. The engine rotation pick-up produces 256 pulses per revolution for purposes of the preferred embodiment. Engine rotation speed is directly determined and engine position is determined from a combination of signals from pick-ups 14, 15 and 17. The engine is shown being driven through its flywheel, but may be driven from the other end equally as well.

The output of the oil pressure transducers 5 and 6, the engine rotation pick-up 14, and the top dead center pick-up 15 are fed to the instrumentation package 16. In addition, a pressure transducer 17 is shown inserted in the No. 1 cylinder of the engine and the pressure pulse is also fed to the instrumentation package.

In operation, an engine to be tested is moved into the station, connected to the oil filter adapter 7, and the rotating drive, top dead center pick-up 15 and cylinder pressure transducer 17 are positioned. The engine is then rotated by means of drive motor 11.

Once stabilized at speed, the oil test is begun by energizing solenoid valve 3. The flow data from pressure transducers 5 and 6, rotation pick-up 14, top dead center pick-up 15 and cylinder pressure transducer 17 is monitored and recorded for at least one full operating cycle, or two revolutions of the engine crankshaft, after which time the solenoid valve is closed and the test is completed.

Other tests may be performed at the same station; for example, compression tests of all the cylinders, manifold vacuum tests, engine oil pump flow and pressure and the like. We are concerned here only with the oil signature and its usefulness as a means of detecting engine assembly faults such as missing or out of tolerance rod or main bearings and/or plugged oil passages.

FIG. 3a shows the plot of the engine oil flow signature produced by the differential pressure across the two pressure transducers 5 and 6 in the oil flow measuring means. This oil flow signature was obtained in a four cylinder engine wherein the No. 2 upper rod insert was missing. The importance of the oil signature is that it shows variations of oil flow to the engine for various positions of rotation. As is common with such faults, these faults produce significant variations in the normal oil flow signature which may be identified by a systematic analysis. The present invention suggests such as systematic analysis as a means of detecting common faults in engine manufacturing.

Figure 3B:
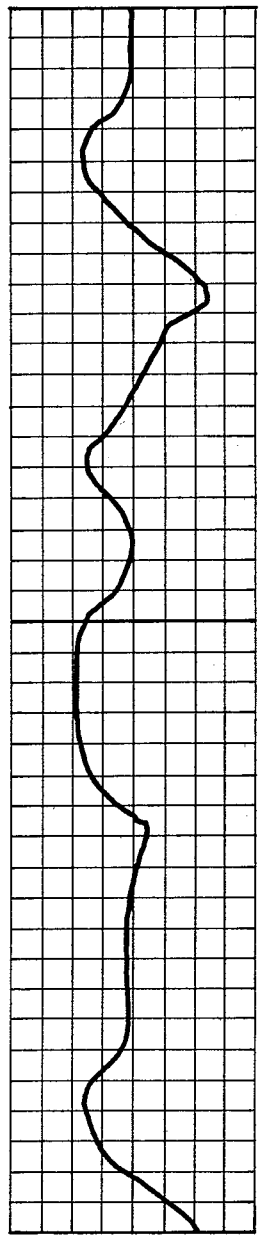

As shown in FIG. 3b, measurement of the oil pressure taken from pressure transducer 6 may also be used, but appears to be a less sensitive indicator.

Figure 3C:
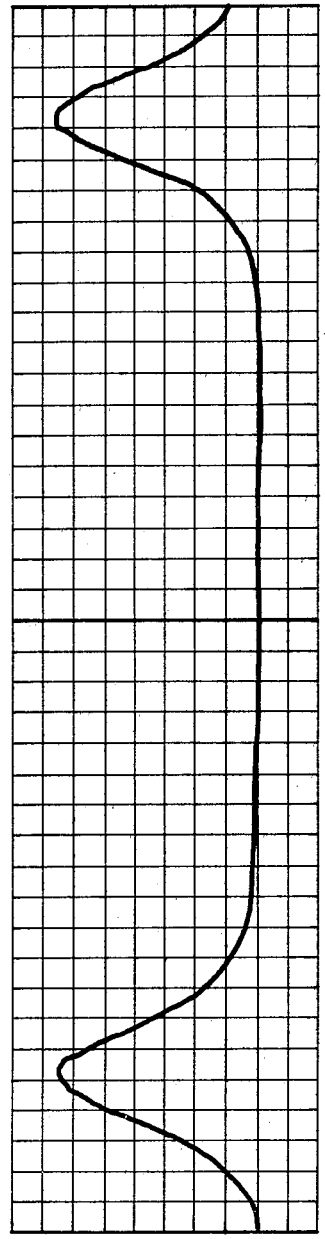

FIG. 3c shows the plot of the compression in cylinder No. 1 and serves as a position indicator relative to the cycle of the engine.

Figure 3D:
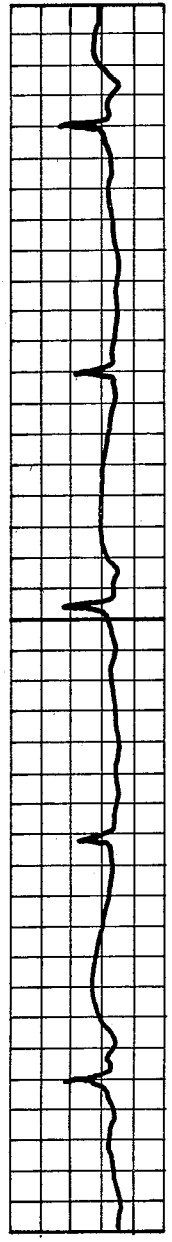

FIG. 3d shows pulses produced by the top dead center pick-up. Each pulse corresponds to one half revolution of the crank, the larger spike corresponding to the top dead center of the No. 1 piston.

Figure 4:
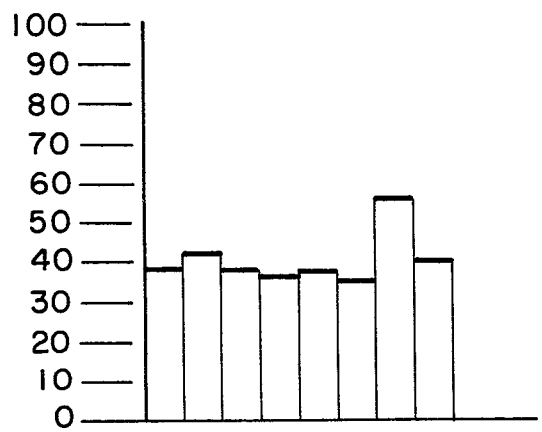
FIG. 4 is a plot of the area under the oil signature curve of FIG. 3a as divided into eight equal segments for one complete operating cycle of the engine or two full revolutions. Each of the eight segments represents an integrated value formed from averaging thirty two individual oil flow readings. The fault detected in this illustration is a missing No. 2 upper rod insert.

In addition to the visual plots represented by FIGS. 3a through 3d, the intrumentation package also analyzes the area under the oil signature curve by dividing 512 increments of flow into eight equal segments. The flow for each segment is shown in FIG. 4 as an average differential pressure plot. Actually, this is an average summation for the values of pressure differential increments obtained for each of the 512 pulses produced from the position pick-up 14 as a keying device. Each segment therefore represents the averaging of 64 pulses, or individual pressure differential readings across the orifice. Knowing the calibration of the orifice, these may also be converted to oil flow amounts if desired, but it is sufficient for purposes of the present invention to understand that the common engine manufacturing faults of missing rod and main bearings and/or plugged oil passages may be isolated by means of a systematic analysis of flow proportions relative to the engine position as described above.

Figure 5:
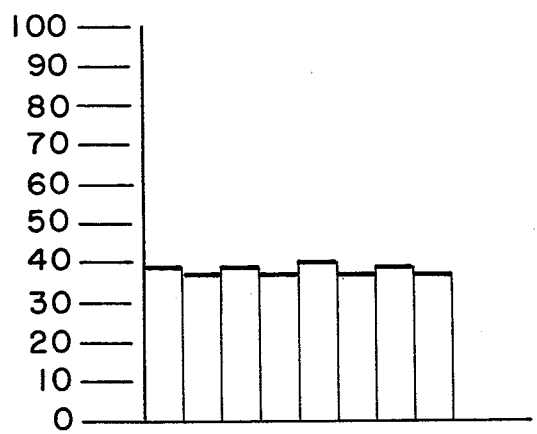
FIG. 5, for comparison with FIG. 4, is a plot similar to FIG. 4 for a reference engine with no faults.
Figure 6:
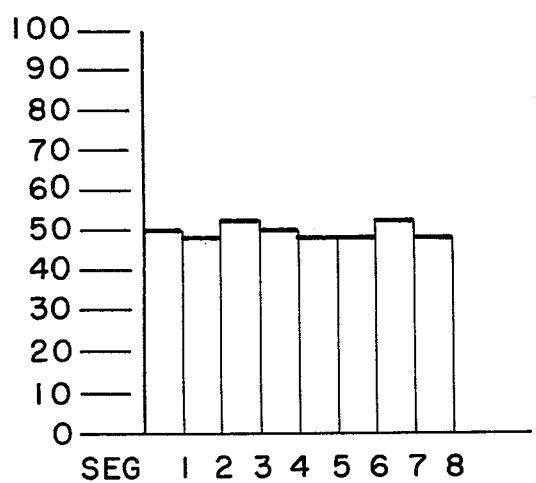
FIG. 6 is a plot similar to FIG. 4 wherein the No. 2 main bearing is missing.

FIG. 5 shows the same flow analysis pattern for a good engine, while FIG. 6 shows the same data for an engine with a missing No. 2 main bearing. Here, the oil flow is significantly higher relative to that identified for a good engine.

Although we have described our invention in terms of a preferred embodiment, it should be understood by one skilled in the art that numerous modifications are possible and we do not wish to be limited within the scope of our invention except by the following claims.

We claim:

1. An apparatus for engine testing comprising:
 means for rotating the engine;
 means for supplying a fluid to the pressure oil supply gallery of said engine;
 means for measuring the instantaneous flow of said fluid on a continuing basis as said engine is rotated;
 means for determining the position of said engine in its rotating cycle; and
 means for determining the amount of said fluid flow relative to the position of said engine in its rotating cycle.

2. An apparatus for engine testing according to claim 1 wherein said means for rotating the engine further comprises a constant speed electric motor means.

3. An apparatus for engine testing according to claim 1 wherein said means for supplying fluid further comprises a means to supply fluid at constant pressure, said means further comprising a pressurized reservoir to assure adequate flow.

4. An apparatus for engine testing according to claim 1 wherein said means for measuring the flow of said fluid comprises an orifice with means for measuring the fluid pressure upstream and a means for measuring the fluid pressure downstream and creating a differential pressure signal.

5. An apparatus for engine testing according to claim 4 wherein said orifice is a sharp edged orifice, and said means for measuring upstream fluid pressure is a pressure transducer, and said means for measuring said downstream fluid pressure is a pressure transducer, and wherein said differential pressure signal is the difference between the output of said pressure transducers.

6. An apparatus for engine testing according to claim 4 wherein the upstream fluid pressure at the orifice is a known value from a controlled pressure source.

7. An apparatus for engine testing according to claim 1 wherein said means for determining the position of said engine in its rotating cycle further comprises an electrical multipoint pick-up device.

8. An apparatus for engine testing according to claim 7 wherein at least one pick-up device detects crankshaft position and at least one pick-up device indicates crankshaft phase relationship to valve actuation, such as camshaft position.

9. An apparatus for engine testing according to claim 8 wherein said multipoint pick-up device emits detection signals in response to engine rotation.

10. An apparatus for engine testing according to claim 9 wherein said signals initiate the reading of said means for measuring the flow of said fluid in equal spaced increments of engine rotation.

11. An apparatus for engine testing according to claim 1 wherein said means for determining the amount of said fluid flow relative to the position of said engine in its rotating cycle further comprises a means for summing the flow of the increments in equal segments relative to the position of the engine during rotation.

12. An apparatus for engine testing according to claim 11 wherein the summed flows of specific amounts of engine rotating cycle are compared to other summed flows of other specific amounts of rotating cycle and/or compared to standard flow to assess the integrity of the engine.

13. An apparatus for engine testing according to claim 11 wherein the number of segments selected is approximately two times the number of engine cylinders.

14. An apparatus for engine testing according to claim 3 wherein the fluid supply is at a constant temperature to control viscosity.

15. An apparatus for engine testing according to claim 1 wherein said fluid is lubricating oil.

16. An apparatus for engine testing according to claim 15 wherein the comparisons are done by microcomputer.

* * * * *